(12) United States Patent
Race

(10) Patent No.: US 8,997,498 B2
(45) Date of Patent: Apr. 7, 2015

(54) SYSTEM FOR USE IN CONTROLLING THE OPERATION OF POWER GENERATION SYSTEMS

(75) Inventor: Nathan Stafford Race, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 13/271,703

(22) Filed: Oct. 12, 2011

(65) Prior Publication Data

US 2013/0091855 A1   Apr. 18, 2013

(51) Int. Cl.
| | |
|---|---|
| F02C 7/12 | (2006.01) |
| F02C 9/00 | (2006.01) |
| F01D 25/12 | (2006.01) |
| F01D 5/08 | (2006.01) |
| F02C 7/16 | (2006.01) |
| F01D 19/02 | (2006.01) |

(52) U.S. Cl.
CPC ............... *F01D 25/12* (2013.01); *F01D 5/081* (2013.01); *F01D 5/082* (2013.01); F01D 19/02 (2013.01); F05D 2260/2322 (2013.01); *F02C 7/16* (2013.01); Y02T 50/675 (2013.01); Y02E 20/16 (2013.01)

(58) Field of Classification Search
USPC ............. 60/39.091, 39.15, 39.182, 39.3, 773, 60/779, 806
See application file for complete search history.

(56) References Cited

U.S. PATENT DOCUMENTS

| | | | |
|---|---|---|---|
| 4,031,404 A * | 6/1977 | Martz et al. ................. | 290/40 R |
| 4,117,669 A * | 10/1978 | Heller ............................. | 60/786 |
| 4,184,797 A | 1/1980 | Anderson et al. | |
| 4,424,668 A | 1/1984 | Mukherjee | |
| 4,571,935 A * | 2/1986 | Rice ................................ | 60/775 |
| 5,318,404 A | 6/1994 | Carreno et al. | |
| 5,340,274 A | 8/1994 | Cunha | |
| 5,579,631 A * | 12/1996 | Chen et al. ...................... | 60/775 |
| 5,593,274 A | 1/1997 | Carreno et al. | |
| 6,065,282 A | 5/2000 | Fukue et al. | |
| 6,293,088 B1 | 9/2001 | Moore et al. | |
| 6,324,829 B1 * | 12/2001 | Kita et al. .................. | 60/39.182 |
| 6,334,295 B1 | 1/2002 | Eldrid et al. | |
| 6,339,926 B1 * | 1/2002 | Ichiro et al. ................ | 60/39.182 |
| 6,435,814 B1 | 8/2002 | Yu et al. | |
| 6,491,495 B1 | 12/2002 | Marushima et al. | |
| 6,502,403 B1 | 1/2003 | Tazaki et al. | |
| 6,506,013 B1 | 1/2003 | Burdgick et al. | |
| 6,519,849 B2 | 2/2003 | Endres | |
| 6,546,713 B1 | 4/2003 | Hidaka et al. | |
| 6,648,600 B2 | 11/2003 | Takahashi et al. | |
| 6,772,581 B2 * | 8/2004 | Ojiro et al. ................. | 60/39.182 |
| 6,994,516 B2 | 2/2006 | Takahashi et al. | |
| 8,061,971 B2 * | 11/2011 | Roush et al. .................. | 415/108 |
| 8,677,761 B2 * | 3/2014 | Leach et al. .................... | 60/779 |
| 2013/0091856 A1 * | 4/2013 | Race ............................... | 60/773 |

* cited by examiner

*Primary Examiner* — Phutthiwat Wongwian
*Assistant Examiner* — Arun Goyal
(74) *Attorney, Agent, or Firm* — Armstrong Teasdale LLP

(57) ABSTRACT

A control system is provided. The control system includes at least one sensor that is positioned within a turbine engine and is configured to detect at least one first operating parameter therein. A controller is coupled to the sensor. The controller is configured to receive at least one second operating parameter of the turbine engine. Moreover, the controller is configured to control a flow of a fluid to a rotor assembly within the turbine engine such that at least one of the first operating parameter and the second operating parameter is less than at least one threshold value.

20 Claims, 2 Drawing Sheets

SYSTEM FOR USE IN CONTROLLING THE OPERATION OF POWER GENERATION SYSTEMS

BACKGROUND OF THE INVENTION

The field of the invention relates generally to power generation systems and, more particularly, to control systems and methods for use in controlling the operation of power generation systems.

At least some known power generation systems include turbine engines, such as gas turbine engines, that include a rotor assembly. At least some known rotor assemblies include a rotor shaft, at least one rotor disk coupled to the rotor shaft, and a plurality of circumferentially-spaced blades or buckets that are coupled to each rotor disk. Each blade or bucket includes an airfoil that extends radially outward from a platform towards a casing.

During operation of at least some known gas turbine engines, the compressor compresses air, which is mixed with fuel and channeled to the combustor. The mixture is then ignited generating hot combustion gases that are then channeled to the turbine. The turbine extracts energy from the combustion gases for powering the compressor, as well as producing useful work to power a load, such as an electrical generator, or to propel an aircraft in flight. However, continued exposure to high temperatures may cause damage to such components, such as inducing corrosion on the surfaces of the components and/or causing heat-related cracking of the components. Continued operation with a worn or damaged component may cause additional damage to other components and/or may lead to a failure of other components of the turbine engine. In order to maintain temperature levels within, for example, the rotor assembly, compressor extraction flow may be channeled throughout the rotor assembly. Such flow, however, may dilute the hot turbine gases that would have otherwise expanded to produce more work for the turbine engine. Accordingly, the rated power output for the turbine engine may not be generated.

BRIEF DESCRIPTION OF THE INVENTION

In one embodiment, a control system is provided. The control system includes at least one sensor that is positioned within a turbine engine and is configured to detect at least one first operating parameter therein. A controller is coupled to the sensor. The controller is configured to receive at least one second operating parameter of the turbine engine. Moreover, the controller is configured to control a flow of a fluid to a rotor assembly within the turbine engine such that at least one of the first operating parameter and the second operating parameter is less than at least one threshold value.

In another embodiment, a power generation system is provided. The power generation system includes at least one fluid generating system. At least one turbine engine that includes a rotor assembly is coupled to the fluid generating system via at least one conduit. At least one control valve is coupled to the conduit. At least one control system is coupled to the turbine engine and to the control valve. The control system includes at least one sensor that is positioned within the turbine engine and is configured to detect at least one first operating parameter therein. A controller is coupled to the sensor. The controller is configured to receive at least one second operating parameter of the turbine engine. Moreover, the controller is configured to control a flow of a fluid to a rotor assembly within the turbine engine such that at least one of the first operating parameter and the second operating parameter is less than at least one threshold value.

In yet another embodiment, a method for controlling the operation of a power generation system is provided. At least one first operating parameter within a turbine engine is detected via a sensor. At least one second operating parameter of the turbine engine is received via a controller. A flow of a fluid is controlled, via the controller, to a rotor assembly within the turbine engine such that at least one of the first operating parameter and the second operating parameter within the turbine engine are less than at least one threshold value.

DETAILED DESCRIPTION OF THE INVENTION

The exemplary methods and systems described herein provide a control system that enables the maintenance of operating parameters, such as temperature, within a turbine engine. The control system includes at least one sensor that is positioned within a turbine engine and is configured to detect at least one first operating parameter therein. A controller is coupled to the sensor. The controller is configured to receive at least one second operating parameter of the turbine engine. Moreover, the controller is configured to control a flow of a fluid to a rotor assembly within the turbine engine such that at least one of the first operating parameter and the second operating parameter is less than at least one threshold value. By controlling the fluid flow that is channeled to the rotor assembly, the operating parameters within the turbine engine may be maintained below threshold values. For example, temperature levels may be at levels such that heat related damage to components within the rotor assembly may be prevented and hot turbine gases may not be readily diluted.

Figure 1:
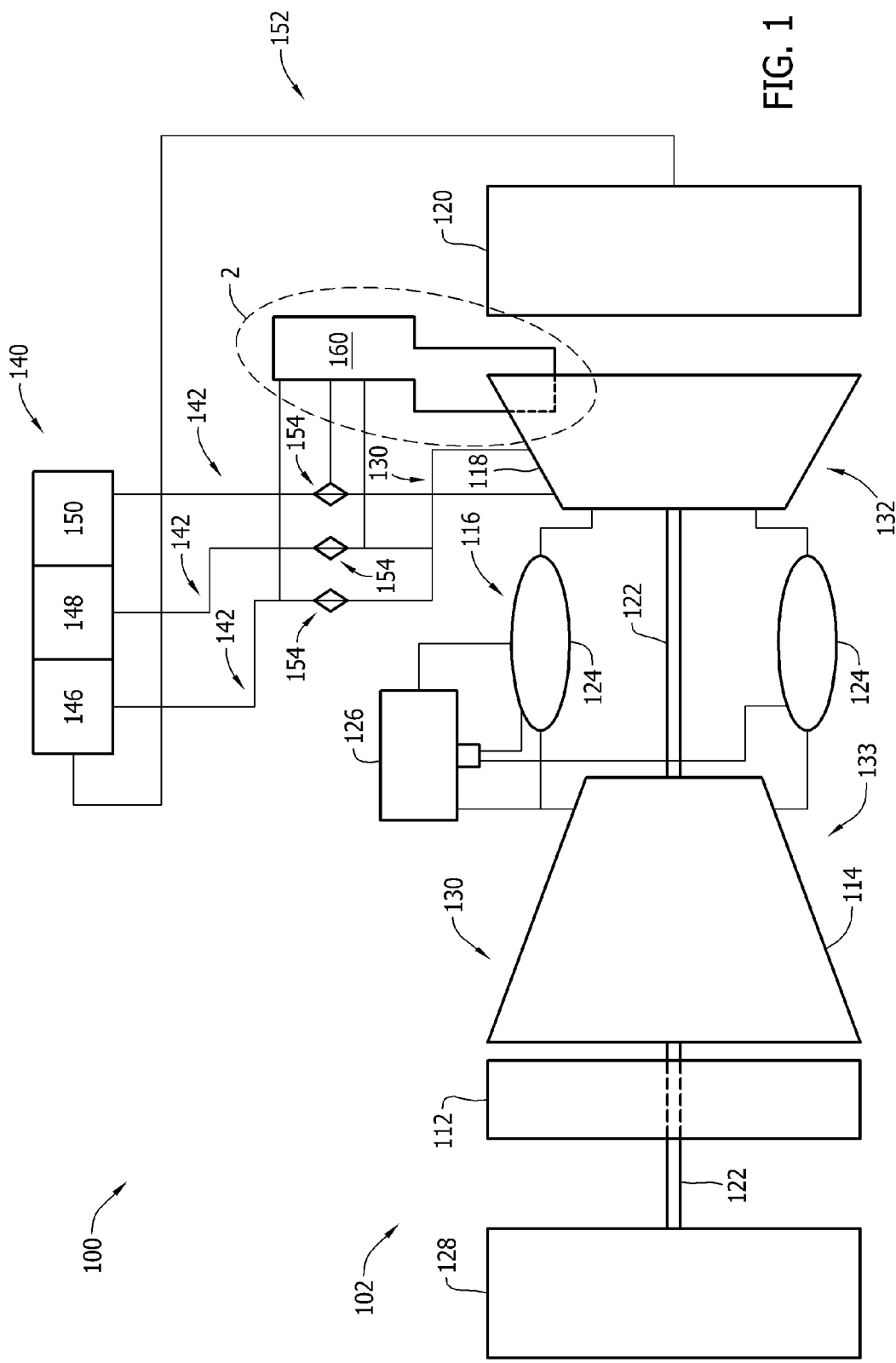
FIG. 1 is a block diagram of an exemplary power generation system.

FIG. 1 is a schematic illustration of an exemplary power generation system 100. More specifically, in the exemplary embodiment, system 100 is a combined-cycle power generation system. Although the exemplary embodiment illustrates a combined-cycle power generation system, the present invention is not limited to combined-cycle power generation systems or other types of power generation systems, and one of ordinary skill in the art will appreciate that the current invention may be used in connection with any type of system.

In the exemplary embodiment, system 100 includes at least one gas turbine engine 102. Gas turbine engine 102 includes an intake section 112, a compressor section 114 coupled to intake section 112, a combustor section 116 is coupled to compressor section 114, a turbine section 118 is coupled to combustor section 116, and an exhaust section 120. Turbine section 118 is coupled to compressor section 114 via a rotor shaft 122.

In the exemplary embodiment, combustor section 116 includes a plurality of combustors 124. A fuel nozzle assembly 126 is coupled to each combustor 124. Turbine section 118 is coupled to compressor section 114 and to a load 128 such as, but not limited to, an electrical generator and/or a mechanical drive application. In the exemplary embodiment, each compressor section 114 and turbine section 118 includes at least one rotor disk assembly 130 that is coupled to a rotor shaft 122 to form a rotor assembly 132.

At least one fluid generating system 140 is coupled to gas turbine engine 102 via at least one steam conduit 142. Fluid generating system 140 may also be coupled to a steam turbine engine (not shown). In the exemplary embodiment, fluid generating system 140 is a heat recovery steam generator (HRSG) that includes a high pressure (HP) superheater section 146, a reheater/intermediate pressure (RH/IP) section 148, and a low pressure (LP) section 150. Alternatively, fluid generating system 140 may be any other type of system that generates and/or obtains thermal fluid, such as, for example, a carbon dioxide capture facility.

In the exemplary embodiment, HP superheater section 146, RH/IP section 148, and LP section 150 are each coupled to rotor assembly 132 in turbine section 118 via steam conduits 142. While not shown in FIG. 1, HP superheater section 146, RH/IP section 148, and LP section 150 may also be coupled to rotor assembly 132 in compressor section 114 via steam conduits 142. Steam conduits 142 are configured to enable flow communication between each HP superheater section 146, RH/IP section 148, and LP section 150 and rotor assembly 132 in the compressor section 114 and/or turbine section 118. Fluid generating system 140 is also coupled to exhaust section 120 via an exhaust conduit 152 that is configured to enable exhaust gases to be channeled from exhaust section to HP superheater section 146. Each steam conduit 142 has at least one control valve 154 positioned and coupled therein. In the exemplary embodiment, each control valve 154 is a throttling valve. Alternatively, each control valve 154 may be any other type of device that may limit and/or prevent fluid flow within each steam conduit 142 and that enables system 100 to function as described herein.

In the exemplary embodiment, power generation system 100 includes a control system 160 that is coupled to gas turbine engine 102. Control system 160 is configured to detect or receive a plurality of operating parameters of gas turbine engine 102. For example, control system 160 is configured to detect at least one first operating parameter of gas turbine engine 102. Control system 160 may also receive at least one second operating parameter of gas turbine engine 102. The first and second operating parameters may include, for example, a temperature, a change in temperature, a pressure, and/or a change in pressure. Alternatively, control system 160 may detect any other parameters for gas turbine engine 102 that enables system 100 to function as described herein. Control system 160 is also configured to determine at least one threshold value for the various operating parameters of gas turbine engine 102 and to compare, for example, the first and second operating parameters with the respective threshold values.

Control system 160, in the exemplary embodiment, is configured to control a flow of a fluid to rotor assembly 132 such that first operating parameter and/or second operating parameter is less than at least one threshold value. For example, in the exemplary embodiment, control system 160 is configured to control a flow of steam from each HP superheater section 146, RH/IP section 148, and LP section 150 to rotor assembly 132 such that the temperature and/or pressure within rotor assembly is less than the threshold temperature and/or pressure values, respectively. Alternatively, control system 160 may control the flow of any other thermal fluid, such as carbon dioxide and/or nitrogen gas, from fluid generating system 140 to rotor assembly 132 that enables system 100 to function as described herein.

Control system 160 is also coupled to each control valve 154. In the exemplary embodiment, control system 160 is configured to operate control valves 154 via operative control features of each valve 154, such as opening or closing valves 154 to facilitate controlling the flow of fluid, such as steam, within conduits 142. In the exemplary embodiment, control system 160 is enabled to facilitate modulations, operative openings, and/or closing features of control valves 154 via features that include, without limitation, receiving permissive inputs, transmitting permissive outputs, and transmitting opening and closing commands.

During operation, fuel is channeled to gas turbine engine 102 and intake section 112 channels air towards compressor section 114 wherein the air is compressed to a higher pressure and temperature prior to being discharged towards combustor section 116. The compressed air is mixed with fuel and ignited to generate combustion gases that are channeled towards turbine section 118. More specifically, in combustors 124, fuel, for example, natural gas and/or fuel oil, is injected into the air flow, and the fuel-air mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132. In the exemplary embodiment, exhaust gases from exhaust section 120 are channeled to fluid generating system 140 via exhaust gas conduit 156, wherein steam is generated. More specifically, in the exemplary embodiment, HP superheater section 146 generates steam.

As explained in more detail below, during operation, control system 160 uses fluid, such as steam, to maintain operating parameters within turbine engine 102, such as within rotor assembly 132. In the exemplary embodiment, control system 160 determines at least one threshold value for various operating parameters within turbine engine 102. Control system 160 may also detect and/or receive various operating parameters for turbine engine 102. For example, control system 160 may detect a temperature value from at least one location within rotor assembly 132. Control system 160 may also receive a pressure value from within rotor assembly. Depending on whether the detected temperature and/or pressure values within rotor assembly 132 are greater than, less than, or equal to a corresponding threshold temperature value and/or a threshold pressure value, control system controls the flow of a fluid, such as steam, from each HP superheater section 146, RH/IP section 148, and LP section 150 to rotor assembly 132 such that the temperature and/or pressure within rotor assembly is maintained below corresponding the threshold values. More specifically, in the exemplary embodiment, control system 160 modulates control valves 154 in an open or closed position to facilitate controlling the flow of high pressure steam, intermediate pressure steam, or low pressure steam in conduits 142 to rotor assembly 132. Steam may then be channeled through various passages (not shown) between components (not shown) of rotor assembly 132. Moreover, while the exemplary embodiment illustrates steam as the fluid being channeled to rotor assembly 132, other fluids, such as carbon dioxide gas and nitrogen gas, may also be channeled to rotor assembly 132.

By controlling the fluid flow that is channeled to rotor assembly 132, the operating parameters within turbine engine 102 may be maintained below threshold values. For example, by controlling the steam flow that is channeled to rotor assembly 132, the temperature and/or pressure therein is maintained at levels such that heat related damage to the components within rotor assembly 132 may be prevented. The use of steam may also prevent the hot turbine gases from being readily diluted.

Figure 2:
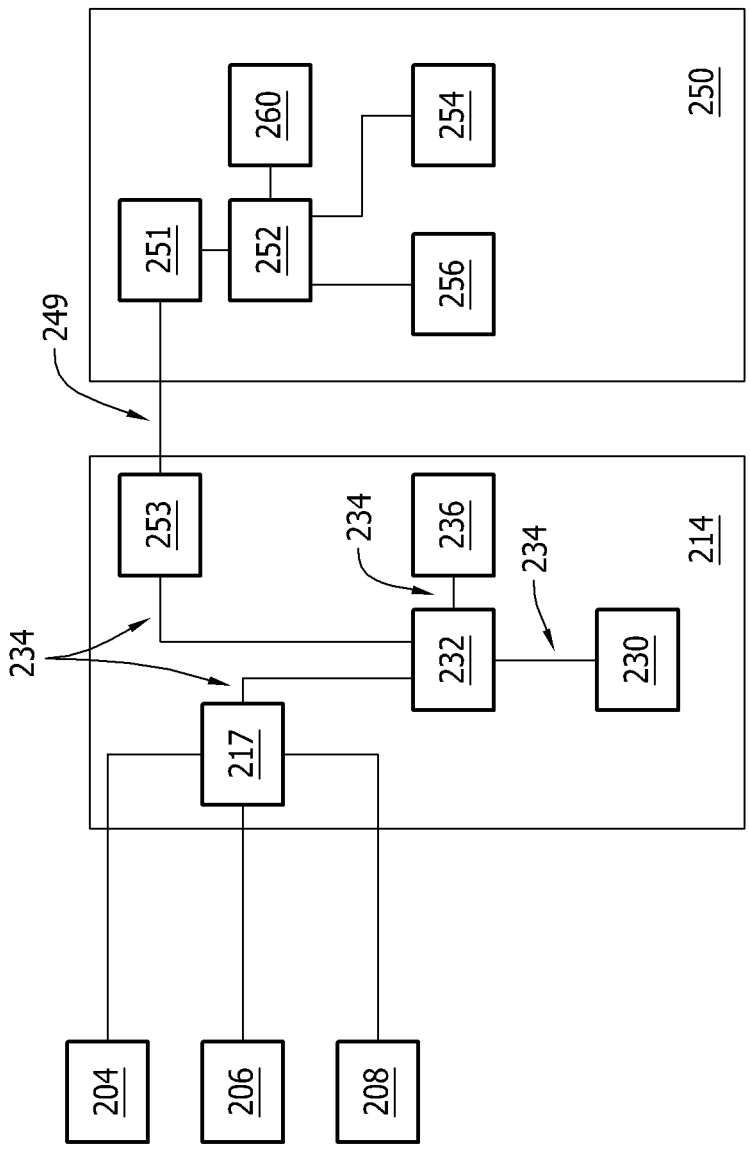
FIG. 2 is a block diagram of an exemplary control system that may be used with the power generation system shown in FIG. 1 and taken along area 2.

FIG. 2 is a schematic diagram of control system 160 taken along area 2 (shown in FIG. 1). In the exemplary embodiment, control system 160 includes at least one sensor or transducer, such as sensors 204, 206, and 208, that are each positioned in close proximity to, and coupled to various portions of rotor assembly 132 (shown in FIG. 1). Alternatively, sensors 204, 206, and 208 may be coupled various other components within turbine engine 102 (shown in FIG. 1). In the exemplary embodiment, sensors 204, 206, and 208 each detect various operating parameters of gas turbine engine 102. More specifically, in the exemplary embodiment, sensors 204, 206, and 208 each detect temperatures of the various respective portion of rotor assembly 132 that sensors 204, 206, and 208 are coupled to. Alternatively, sensors 204, 206, 208 may each detect a change in temperature, pressure, and/or a change in pressure of the various respective portions of rotor assembly 132 that each sensor 204, 206, and 208 is coupled to. Alternatively, sensors 204, 206, and 208 may detect various other operating parameters that enable control system 160 and/or power generation system 100 (shown in FIG. 1) to function as described herein. Gas turbine engine 102 may also include other sensors (not shown) that may transmit signals of other operating parameters of gas turbine engine 102 to control system 160.

Moreover, in the exemplary embodiment, control system 160 includes a controller 214 that is coupled to each sensor 204, 206, and 208. More specifically, controller 214 includes a sensor interface 217 and each sensor 204, 206, and 208 is coupled to interface 217. Each sensor 204, 206, and 208 transmits a signal corresponding to at least one operating parameter detected for the respective portion of rotor assembly 132 that each sensor 204, 206, and 208 is coupled to. Moreover, each sensor 204, 206, and 208 may transmit a signal continuously, periodically, or only once, for example. Other signal timings may also be contemplated. Furthermore, each sensor 204, 206, and 208 may transmit a signal either in an analog form or in a digital form. Gas turbine engine 102 also includes other sensors (not shown) that may transmit signals of operating parameters of gas turbine engine to sensor interface 217.

Various connections are available between sensor interface 217 and sensors 204, 206, and 208. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside power generation system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash.

Further, in the exemplary embodiment, controller 214 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 214 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

In the exemplary embodiment, controller 214 also includes a memory device 230 that stores executable instructions and/or one or more operating parameters representing and/or indicating an operating condition of power generation system 100. For example, in the exemplary embodiment, memory device 230 may store the temperature values that are detected by sensors 204, 206, and 208. In the exemplary embodiment, controller 214 also includes a processor 232 that is coupled to memory device 230 and sensor interface 217 via a system bus 234.

In the exemplary embodiment, processor 232 is programmed to determine at least one threshold value for various operating parameters of gas turbine engine 102. For example, processor may be programmed to determine a temperature and/or a pressure threshold value for within rotor assembly 132. Processor 232, for example, may determine a threshold temperature value by calculating an average of the temperature values that are detected by sensors 204, 206, and 208. The threshold temperature values may change depending on the various times during the operational state of turbine engine 102 that sensors detect temperature values. Processor 232 may also determine a threshold temperature value based at least in part on at least one operational state of gas turbine engine 102 (shown in FIG. 1) and the threshold values may change accordingly. For example, rotor assembly 132 may need a lower temperature during a start-up of turbine engine 102 such that internal gradients may be reduced within the components of rotor assembly 132. As such, a low threshold temperature value may be determined. At a steady state for turbine engine 102, a substantially lower temperature may be needed for rotor assembly to enable heat reduction from various flow paths within rotor assembly 132. In such a case, a low threshold temperature value may also be determined. During shut-down of turbine engine 102, it may be desirable to maintain the temperature within rotor assembly 132 at a substantially higher temperature value such that rotor assembly 132 may remain warm to enable efficient start-up of turbine engine 102 at a later time. Accordingly, a high threshold temperature value may be determined. Processor 232 is also programmed to compare the operating parameters detected by sensors 204, 206, and 208 with the determined threshold temperature values to determine whether the detected temperature values are greater than, less than, or equal to the threshold temperature value. Processor 232 may also be programmed to receive operating parameters from the other sensors within gas turbine engine 102 and compare those operating parameters with determined threshold values to determine whether the detected temperature values are greater than, less then, or equal to the threshold temperature values.

In one embodiment, processor 232 may include a processing unit, such as, without limitation, an integrated circuit (IC), an application specific integrated circuit (ASIC), a microcomputer, a programmable logic controller (PLC), and/or any other programmable circuit. Alternatively, processor 232 may include multiple processing units (e.g., in a multi-core configuration). The above examples are exemplary only, and thus are not intended to limit in any way the definition and/or meaning of the term "processor."

Moreover, in the exemplary embodiment, controller 214 includes a control interface 236 that controls an operation of power generation system 100. In the exemplary embodiment, control interface 236 is coupled to one or more power generation system control devices, such as control valves 154

(shown in FIG. 1). In the exemplary embodiment, controller 214 processes the signal(s) received by sensors 204, 206, and 208 to generate one or more control parameters. Control interface 236 also transmits a control parameter (e.g., open or close) to control valves 154. For example, processor 232 encodes a control parameter in a signal.

Various connections are available between control interface 236 and control valves 154. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside power generation system 100) network connection, whether wired or wireless.

In the exemplary embodiment, control system 160 also includes a user computing device 250 that is coupled to controller 214 via a network 249. More specifically, user computing device 250 includes a communication interface 251 that is coupled to a communication interface 253 contained within controller 214. User computing device 250 includes a processor 252 for executing instructions. In some embodiments, executable instructions are stored in a memory device 254. Processor 252 may include one or more processing units (e.g., in a multi-core configuration). Memory device 254 is any device allowing information, such as executable instructions and/or other data, to be stored and retrieved.

User computing device 250 also includes at least one media output component 256 for use in presenting information to a user (not shown). Media output component 256 is any component capable of conveying information to the user. Media output component 256 may include, without limitation, a display device (e.g., a liquid crystal display (LCD), an organic light emitting diode (OLED) display, or an audio output device (e.g., a speaker or headphones)).

Moreover, in the exemplary embodiment, user computing device 250 includes an input interface 260 for receiving input from the user. Input interface 260 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 256 and input interface 260.

During operation, fuel is channeled to gas turbine engine 102 such that thermal energy from the gas stream may be converted to mechanical rotational energy by turbine engine 102. Exhaust gases from exhaust section 120 (shown in FIG. 1) are channeled to fluid generating system 140 (shown in FIG. 1) via exhaust gas conduit 156 (shown in FIG. 1), wherein steam is generated.

During operation, control system 160 uses fluid, such as the generated steam, to maintain operating parameters below their respective threshold values. Control system 160 determines at least one threshold value, such as a threshold temperature value, for a component within gas turbine engine 102, such as rotor assembly 132. Control system 160 also detects at least one actual operating parameter within gas turbine engine 102. For example, control system 160 may detect temperature values from at least one location within rotor assembly 132. More specifically, in the exemplary embodiment, each sensor 204, 206, and 208 detects a temperature value for a portion of rotor assembly 132 that each sensor 204, 206, and 208 is coupled to. Each sensor 204, 206, and 208 then transmits a signal representative of the detected temperature values to sensor interface 217. The other sensors within gas turbine engine 102 may also transmit a signal representative of other operating parameters detected within gas turbine engine 102 to sensor interface 217. For example, pressure sensors (not shown) may transmit pressure values detected within rotor assembly 132 to sensor interface 217.

Sensor interface 217 transmits the data to memory device 230 for storage. More specifically, memory device 230 stores the detected operating parameters. In the exemplary embodiment, processor 232 then determines threshold values for the various operating parameters for gas turbine engine 102. For example, in the exemplary embodiment, processor 232 determines at least one threshold temperature value and/or a pressure value. Processor 232 may determine a threshold temperature value by calculating an average of the temperature values that are detected by sensors 204, 206, and 208. Processor 232 may determine a threshold pressure value by calculating an average of the pressure values received by sensor interface 217. Processor 232 may also determine threshold values based at least in part on at least one operational state of gas turbine engine 102.

When the threshold temperature values are determined, processor 232 compares the temperature values detected by sensors 204, 206, and 208 with the threshold temperature value to determine whether the detected temperature values are greater than, less than, or equal to the threshold temperature value. Similarly, processor 232 may compare the pressure values detected by the other sensors to determine whether the detected pressure values are greater than, less than, or equal to the threshold pressure values. Depending on whether the detected temperature values and/or pressure values are greater than, less than, or equal to the threshold values, control system controls the flow of fluid, such as steam, from each HP superheater section 146 (shown in FIG. 1), RH/IP section 148 (shown in FIG. 1), and LP section 150 (shown in FIG. 1) to rotor assembly 132 such that the temperature and/or pressure within gas turbine engine 102 are maintained below the respective threshold values.

In the exemplary embodiment, control system modulates control valves 154 in an open, partially open, partially closed, or a closed position to facilitate controlling the flow of steam. In the exemplary embodiment, processor 232 transmits a signal to control interface 236 such that control interface 236 may transmit a control parameter to at least one valve 154. Control interface 236 transmits a signal representative of the function to open or close to valves 154 such that steam flow may be channeled to rotor assembly 132. In the exemplary embodiment, valves 154 are opened or closed such that the flow rate of steam within conduits 142 (shown in FIG. 2) changes and/or a supply pressure of steam within conduits 142 changes. For example, valves 154 may be controlled from an open position to a partially or completely closed position in order to substantially reduce or prevent the flow rate of steam and/or to substantially reduce or prevent the supply pressure of steam being channeled within conduits 142 to rotor assembly 132. In contrast, valves 154 may be controlled from a closed position to a partially or completely open position to substantially increase the flow rate of steam and/or to substantially increase the supply pressure of steam being channeled within conduits 142 to rotor assembly 132. Sensors 204, 206, and 208 will continue to detect a temperature value for a portion of rotor assembly 132, and transmit the detected temperature values to controller 214. Controller 214 will continue to regulate the flow of steam to rotor assembly 132 based on the detected temperatures and/or other operating parameters received.

A user may also manipulate the determined threshold values and/or input different threshold values, and/or manipulate the control functions via computing device 250 to enable power generation system 100 to function appropriately. For example, the user may have a visual display of the determined threshold values via media output component 256. The user may input various command functions via input interface 260. Processor 252 then transmits a signal to communication interface 251. Communication interface 251 transmits the information to controller 214 via network 249. Communication interface 253 receives the information and transmits a signal to processor 232. Processor 232 may then generate new threshold values and/or transmit a signal to control interface 236 such that control interface 236 may transmit a signal representative of the function to open or close to valves 154.

As compared to known systems that use turbine engines to generate power, the embodiments described herein provide a control system that enables the maintenance of operating parameters, such as temperature, within a turbine engine. The control system includes at least one sensor that is positioned within a turbine engine and is configured to detect at least one first operating parameter therein. A controller is coupled to the sensor. The controller is configured to receive at least one second operating parameter of the turbine engine. Moreover, the controller is configured to control a flow of a fluid to a rotor assembly within the turbine engine such that at least one of the first operating parameter and the second operating parameter is less than at least one threshold value. By controlling the fluid flow that is channeled to the rotor assembly, the operating parameters within the turbine engine may be maintained below threshold values. For example, temperature levels may be at levels such that heat related damage to components within the rotor assembly may be prevented and hot turbine gases may not be readily diluted.

A technical effect of the systems and methods described herein includes at least one of: (a) detecting at least one first operating parameter within a turbine engine via a sensor; (b) receiving, via a controller, at least one second operating parameter of a turbine engine; and (c) controlling, via a controller, a flow of a fluid to a rotor assembly within a turbine engine such that at least one of at least one first operating parameter and at least one second operating parameter within the turbine engine are less than at least one threshold value.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and are not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:
   at least one sensor positioned within a turbine engine and configured to detect at least one first operating parameter therein; and
   a controller coupled to said at least one sensor, said controller is configured to:
   receive at least one second operating parameter of the turbine engine;
   determine a first temperature threshold value associated with a start-up operating state of the turbine engine, wherein the first temperature threshold value is selected to limit an internal temperature gradient within a rotor assembly of the turbine engine;
   determine a second temperature threshold value associated with a shut-down operating state of the turbine engine, wherein the second temperature threshold value is selected to maintain a warmth of the rotor assembly after shut-down is completed, wherein the second temperature threshold value is higher than the first temperature threshold value;
   control a flow of a fluid to the rotor assembly in the start-up operating state such that at least one of the at least one first operating parameter and the at least one second operating parameter is less than the first temperature threshold value; and
   control the flow of the fluid to the rotor assembly in the shut-down operating state such that at least one of the at least one first operating parameter and the at least one second operating parameter is less than the second temperature threshold value.

2. A control system in accordance with claim 1, wherein said controller is configured to control a flow of at least one of carbon dioxide gas, steam, and nitrogen gas to the rotor assembly.

3. A control system in accordance with claim 1, wherein said controller is further configured to determine a third temperature threshold value associated with a steady operating state of the turbine engine, wherein the third threshold temperature value is substantially less than the first temperature threshold value.

4. A control system in accordance with claim 1, wherein said controller is further configured to compare at least one of the at least one first operating parameter and the at least one second operating parameter with at least one of the first threshold temperature value and the second threshold temperature value.

5. A control system in accordance with claim 1, wherein said controller controls the flow of the fluid by transmitting at least one control parameter via at least one signal to at least one control valve.

6. A control system in accordance with claim 1, wherein said controller controls the flow of the fluid by controlling a flow rate of the fluid.

7. A control system in accordance with claim 1, wherein said controller controls the flow of the fluid by controlling a supply pressure of the fluid.

8. A power generation system comprising:
   at least one fluid generating system;
   at least one turbine engine comprising a rotor assembly and coupled to said at least one fluid generating system via at least one conduit;

at least one control valve coupled to said at least one conduit; and at least one control system coupled to said at least one turbine engine and to said at least one control valve, said at least one control system comprising:
- at least one sensor positioned within said at least one turbine engine and configured to detect at least one first operating parameter therein; and
- a controller coupled to said at least one sensor, said controller is configured to:
  - receive at least one second operating parameter of said at least one turbine engine;
  - determine a first temperature threshold value associated with a start-up operating state of said at least one turbine engine, wherein the first temperature threshold value is selected to limit an internal temperature gradient within said rotor assembly of said at least one turbine engine;
  - determine a second temperature threshold value associated with a shut-down operating state of said at least one turbine engine, wherein the second temperature threshold value is selected to maintain a warmth of said rotor assembly after shut-down is completed, wherein the second temperature threshold value is higher than the first temperature threshold value;
  - control a flow of a fluid to said rotor assembly in the shut-down operating state such that at least one of the at least one first operating parameter and the at least one second operating parameter is less than the first temperature threshold value; and
  - control the flow of the fluid to said rotor assembly in the shut-down operating state such that at least one of the at least one first operating parameter and the at least one second operating parameter is less than the second temperature threshold value.

9. A power generation system in accordance with claim 8, wherein said controller is configured to control a flow of at least one of carbon dioxide gas, steam, and nitrogen gas to said rotor assembly.

10. A power generation system in accordance with claim 8, wherein said controller is further configured to determine a third temperature threshold value associated with a steady operating state of said at least one turbine engine, wherein the third temperature threshold value is substantially less than the first temperature threshold value.

11. A power generation system in accordance with claim 8, wherein said controller is further configured to compare at least one of the at least one first operating parameter and the at least one second operating parameter with at least one of the first threshold value and the second threshold value.

12. A power generation system in accordance with claim 8, wherein said controller controls the flow of the fluid by transmitting at least one control parameter via at least one signal to said at least one control valve.

13. A power generation system in accordance with claim 8, wherein said controller controls the flow of the fluid by controlling a flow rate of the fluid.

14. A power generation system in accordance with claim 8, wherein said controller controls the flow of the fluid by controlling a supply pressure of the fluid.

15. A method for controlling the operation of a power generation system, said method comprising:
- detecting at least one first operating parameter within a turbine engine via a sensor;
- receiving, via a controller, at least one second operating parameter of the turbine engine;
- determining, via the controller, a first temperature threshold value associated with a start-up operating state of the turbine engine, wherein the first temperature threshold value is selected to reduce an internal temperature gradient within a rotor assembly of the turbine engine;
- determining, via the controller, a second temperature threshold value associated with a shut-down operating state of the turbine engine, wherein the second temperature threshold value is selected to maintain a warmth of the rotor assembly after shut-down is completed, wherein the second temperature threshold value is higher than the first temperature threshold value;
- controlling, via the controller, a flow of a fluid to the rotor assembly in the start-up operating state such that at least one of the at least one first operating parameter and the at least one second operating parameter within the turbine engine are less than the first temperature threshold value; and
- controlling, via the controller, the flow of the fluid to the rotor assembly in the shut-down operating state such that at least one of the at least one first operating parameter and the at least one second operating parameter is less than the second temperature threshold value.

16. A method in accordance with claim 15, wherein controlling, via the controller, a flow of a fluid further comprises controlling, via a controller, a flow of at least one of carbon dioxide gas, steam, and nitrogen gas.

17. A method in accordance with claim 15, further comprising determining a third temperature threshold value associated with a steady operating state of the turbine engine, wherein the third temperature threshold value is substantially less than the first temperature threshold value.

18. A method in accordance with claim 15, further comprising comparing at least one of the at least one first operating parameter and the at least one second operating parameter with at least one of the first threshold value and the second threshold value.

19. A method in accordance with claim 15, wherein controlling, via the controller, a flow of a fluid further comprises controlling, via a controller, a flow of a fluid by transmitting at least one control parameter via at least one signal to at least one control valve.

20. A method in accordance with claim 15, wherein controlling, via the controller, a flow of a fluid further comprises controlling, via a controller, a flow of a fluid by controlling at least one of a flow rate of the fluid and a supply pressure of the fluid.

* * * * *